(12) United States Patent
Tanaka et al.

(10) Patent No.: US 8,716,964 B2
(45) Date of Patent: May 6, 2014

(54) MOTOR DRIVE DEVICE, AND COMPRESSOR AND REFRIGERATOR USING SAME

(75) Inventors: Hidehisa Tanaka, Shiga (JP); Yoshinori Takeoka, Shiga (JP)

(73) Assignee: Panasonic Corporation, Osaka (JP)

( * ) Notice: Subject to any disclaimer, the term of this patent is extended or adjusted under 35 U.S.C. 154(b) by 366 days.

(21) Appl. No.: 13/128,347

(22) PCT Filed: Dec. 1, 2009

(86) PCT No.: PCT/JP2009/006491
§ 371 (c)(1),
(2), (4) Date: May 9, 2011

(87) PCT Pub. No.: WO2010/064402
PCT Pub. Date: Jun. 10, 2010

(65) Prior Publication Data
US 2011/0219816 A1 Sep. 15, 2011

(30) Foreign Application Priority Data

Dec. 2, 2008 (JP) .................................. 2008-307177
Oct. 21, 2009 (JP) .................................. 2009-242026

(51) Int. Cl.
*H02P 6/00* (2006.01)
(52) U.S. Cl.
USPC .................................................... 318/400.01
(58) Field of Classification Search
CPC ............. H02P 6/14; H02P 6/08; H02P 6/182; H02P 6/085; H02P 6/16
See application file for complete search history.

(56) References Cited

U.S. PATENT DOCUMENTS

| 7,294,988 B2 | 11/2007 | Ajima et al. |
| 7,650,760 B2 * | 1/2010 | Nakata et al. ................. 62/228.1 |
| 2006/0039807 A1 | 2/2006 | Hamaoka et al. |
| 2006/0055352 A1 | 3/2006 | Mori et al. |
| 2006/0082339 A1 * | 4/2006 | Hamaoka et al. ............. 318/439 |

(Continued)

FOREIGN PATENT DOCUMENTS

| CN | 1801596 | | 7/2006 |
| JP | 9-074790 | | 3/1997 |
| JP | 09-088837 | * | 3/1997 .............. F04B 49/06 |
| JP | 9-088837 | | 3/1997 |

(Continued)

OTHER PUBLICATIONS

Translation of Japanese Laid-Open Patent Application No. H9-88837 is used in this office action.*

*Primary Examiner* — Shawki S Ismail
*Assistant Examiner* — Zoheb Imtiaz
(74) *Attorney, Agent, or Firm* — Hamre, Schumann, Mueller & Larson, P.C.

(57) ABSTRACT

Phase correction unit (25) for outputting a commutation signal for switching a winding that allows a current to flow to brushless DC motor (4) and drive unit (16) for outputting a drive signal indicating supplying timing of electric power supplied to brushless DC motor (4) by inverter (3) based on the commutation signal output from phase correction unit (25) are provided so as to maintain a predetermined relation between a phase of a current flowing to a predetermined winding of brushless DC motor (4) and a phase of a voltage. Since brushless DC motor (4) is driven by a signal for holding the predetermined relation between the phase of the current and the phase of the voltage, the stability of drive under high-speed and high-load conditions is enhanced and a drive range is extended.

15 Claims, 9 Drawing Sheets

(56) References Cited

U.S. PATENT DOCUMENTS

| | | |
|---|---|---|
| 2006/0125439 A1 | 6/2006 | Ajima et al. |
| 2006/0290312 A1* | 12/2006 | Nagai et al. ............... 318/599 |
| 2009/0056385 A1* | 3/2009 | Maekawa .................. 68/12.16 |
| 2009/0096394 A1* | 4/2009 | Taniguchi ............... 318/400.09 |
| 2009/0218969 A1* | 9/2009 | Sato et al. ............... 318/400.04 |
| 2010/0139333 A1* | 6/2010 | Maekawa et al. ............. 68/212 |

FOREIGN PATENT DOCUMENTS

| | | |
|---|---|---|
| JP | 2004-282911 | 10/2004 |
| JP | 2006-081271 | 3/2006 |
| JP | 2006-101686 | 4/2006 |
| JP | 2006-238524 | 9/2006 |
| JP | 2008-172880 | 7/2008 |
| JP | 2008-278627 | 11/2008 |

* cited by examiner

MOTOR DRIVE DEVICE, AND COMPRESSOR AND REFRIGERATOR USING SAME

TECHNICAL FIELD

The present invention relates to a motor drive device for driving a brushless direct current (DC) motor, as well as a compressor and a refrigerator using the same.

BACKGROUND ART

A conventional motor drive device carries out control by switching between drive under low-load conditions and drive under high-load conditions in order to extend a drive range of a brushless DC motor. That is to say, in low-load conditions, the conventional motor drive device carries out speed control based on a rotation position of the brushless DC motor by pulse width modulation (PWM) feedback control. Furthermore, a conventional motor drive device disclosed in Patent Literature 1 carries out synchronous drive that switches a phase to be energized of the brushless DC motor in a constant cycle in high-load conditions. FIG. 10 is a block diagram showing the conventional motor drive device described in Patent Literature 1.

In FIG. 10, power supply 101 is a general commercial power supply. In Japan, it is a 50 Hz or 60 Hz AC power supply having an effective value of 100 V. Rectifying and smoothing circuit 102 receives an input from AC power supply 101 and rectifies and smoothes DC electric power. Rectifying and smoothing circuit 102 includes four bridge-connected rectifier diodes 102a to 102d, and smoothing capacitors 102e and 102f. Inverter 103 includes six switching elements 103a to 103f which are coupled together via a three-phase full-bridge. Inverter 103 converts DC electric power from rectifying and smoothing circuit 102 into AC electric power, and supplies AC electric power of any voltage and frequency to brushless DC motor 104. Brushless DC motor 104 includes a rotor having a permanent magnet and a stator having three-phase star connected windings.

Counter electromotive voltage detection circuit 105 detects a relative position of the rotor from a counter electromotive voltage generated in a stator winding of brushless DC motor 104. Drive circuit 106 turns on and off switching elements 103a to 103f of inverter 103. Commutation circuit 107 decides which switching element of switching elements 103a to 103f is turned on based on the output from counter electromotive voltage detection circuit 105 when brushless DC motor 104 is driven in a stationary state. Synchronous drive circuit 108 outputs predetermined frequency and predetermined voltage (predetermined duty) when brushless DC motor 104 is driven as a synchronization motor.

Switch circuit 109 switches a signal to be sent to drive circuit 106 between a signal of commutation circuit 107 and a signal of synchronous drive circuit 108. PWM control circuit 110 carries out PWM control by chopping only switching elements of the upper arm or the lower arm of switching elements 103a to 103f of inverter 103. Output voltage is increased or decreased by increasing/decreasing a duty of a pulse width (the rate of the ON period in the pulse cycle). Load condition determination circuit 111 determines a load state of brushless DC motor 104 based on a signal from counter electromotive voltage detection circuit 105, and decides switching of a drive mode by switch circuit 109. Load condition determination circuit 111 includes first timer circuit 112, duty determination circuit 113, and phase determination circuit 114. First timer circuit 112 starts a timer when the drive by synchronous drive circuit 108 is started, and terminates the timer when a predetermined time has passed. Duty determination circuit 113 detects that the load reaches maximum when the duty reaches maximum (100%).

Phase determination circuit 114 detects a phase difference between a signal of counter electromotive voltage detection circuit 105 and a signal of synchronous drive circuit 108 to obtain a present load state. Frequency regulating circuit 115 detects a phase difference between the signal of counter electromotive voltage detection circuit 105 and the signal of synchronous drive circuit 108, and decreases the output frequency from synchronous drive circuit 108 when the detected phase difference is smaller than a predetermined value.

In the conventional motor drive device having the above-mentioned configuration, when a load to the motor is increased, a predetermined speed cannot be occasionally maintained by feedback control while detecting a rotor of brushless DC motor 104. Then, the conventional motor drive device switches the drive to synchronous drive by open loop control so as to be switched to commutation in which the target rotation speed is constant. After the drive is switched to the synchronous drive, the drive is returned to the feedback control again after a predetermined time measured by first timer circuit 112 has passed.

Thus, the rotor of the motor follows commutation timing with delay. In other words, a phase of a terminal voltage leads relative to a phase of an induced voltage, and similarly, a phase of a current is a leading phase relative to the phase of the induced voltage. Thus, the synchronous drive time becomes a state similar to magnetic flux weakening control. Therefore, it is possible to easily extend a drive range of brushless DC motor 104.

Even in a low torque motor that sacrifices the maximum rotation rate in order to improve the efficiency of the motor, a drive range is extended so as to obtain a desired rotation rate at the maximum load point. Moreover, under a usual load, a highly efficient motor can be driven with higher efficiency by feedback control.

However, in the above-mentioned conventional configuration, the brushless DC motor under high-speed and high-load conditions is driven synchronously by open loop in a constant commutation cycle. Therefore, in a predetermined low-load range, the induced voltage follows the applied voltage in a predetermined delayed phase according to the load. That is to say, the rotor of the brushless DC motor follows with respect to the commutation in a predetermined delayed phase. Furthermore, the phase of a current is determined from the relation between the induced voltage and the applied voltage. As a result, the phase relation of the induced voltage, the applied voltage, and a winding current of the brushless DC motor is stable in a predetermined state, and a load range in which drive can be carried out is extended.

However, when the load is a predetermined level or more, the rotor is delayed with respect to the commutation, resulting in a magnetic flux weakening state. That is to say, with reference to the position of the rotor, the phase of the applied voltage and the phase of the current become leading phases with respect to the phase of the induced voltage, resulting in a magnetic flux weakening state. In this state, the rotor is accelerated in synchronization with the commutation cycle. Thereafter, a lead angle of the phase of the current is reduced by the acceleration of the rotor, and this time, the speed of the rotor is reduced. This state is repeated, and the rotor repeats acceleration and deceleration. As a result, a drive state (a drive speed) may not converge into a stable state. That is to say, due to the change in the speed of the rotor, the phase of the induced voltage is unstable, and therefore the phase relation between the phase of the applied voltage and the phase of the current may be changed. In such a drive state, since the rotation rate of the brushless DC motor changes, a beat sound associated with the change in the speed may occur. Furthermore, there may be increase or decrease in the pulsation of a current of the motor by cyclic acceleration and deceleration, a stop of protection of over-current caused by the occurrence of the current pulsation, and finally, possibility of the out-of-synchronism of the brushless DC motor.

In order not to cause such problems, in conventional motor control devices, drive is not carried out in a state in which the rotation of a brushless DC motor is unstable. This means that the drive of the brushless DC motor under high-speed and high-load conditions is limited. In other words, there has been a problem that a drive range cannot be extended (that is, a drive range is narrow).

CITATION LIST

Patent Literature

[Patent Literature 1] Japanese Patent Unexamined Publication No. H9-88837

SUMMARY OF THE INVENTION

The present invention solves the above-mentioned conventional problem, and provides a drive device of a brushless DC motor having high reliability by enhancing the stability of drive of the brushless DC motor under high-speed and high-load conditions so as to extend a drive range, and suppressing an unstable state due to external factors.

A motor drive device of the present invention is configured to drive a brushless DC motor including a rotor and a stator having three-phase windings. Furthermore, the present invention includes an inverter for converting DC electric power to AC electric power and supplying the electric power to the brushless DC motor, and a current phase detection unit for detecting a phase of a current flowing through the brushless DC motor. Furthermore, the present invention includes a phase correction unit for outputting a commutation signal for switching a winding to be energized in the brushless DC motor based on a detection result of the current phase detection unit so that a phase of a current flowing in a predetermined winding of the brushless DC motor and a phase of a voltage hold a predetermined relation. Furthermore, the present invention includes a drive unit for outputting a drive signal to the inverter based on the commutation signal output from the phase correction unit, and the drive signal indicates a supplying timing of electric power supplied to the brushless DC motor by the inverter.

With such a configuration, since the relation between the phase of the current of the motor and the phase of the voltage is maintained by the phase correction unit, although the drive does not detect a position of the rotor of the motor, the rotation of the motor is stabilized also in drive under high-speed and high-load conditions. Therefore, the motor drive device of the present invention can enhance the drive of the brushless DC motor under high-speed and high-load conditions, and can extend a drive range, as well as can suppress an unstable state by external factors. Thus, a drive device of a brushless DC motor having high reliability can be provided.

DETAILED DESCRIPTION OF PREFERRED EMBODIMENTS

Hereinafter, exemplary embodiments of the present invention are described with reference to drawings.

First Exemplary Embodiment

Figure 1:
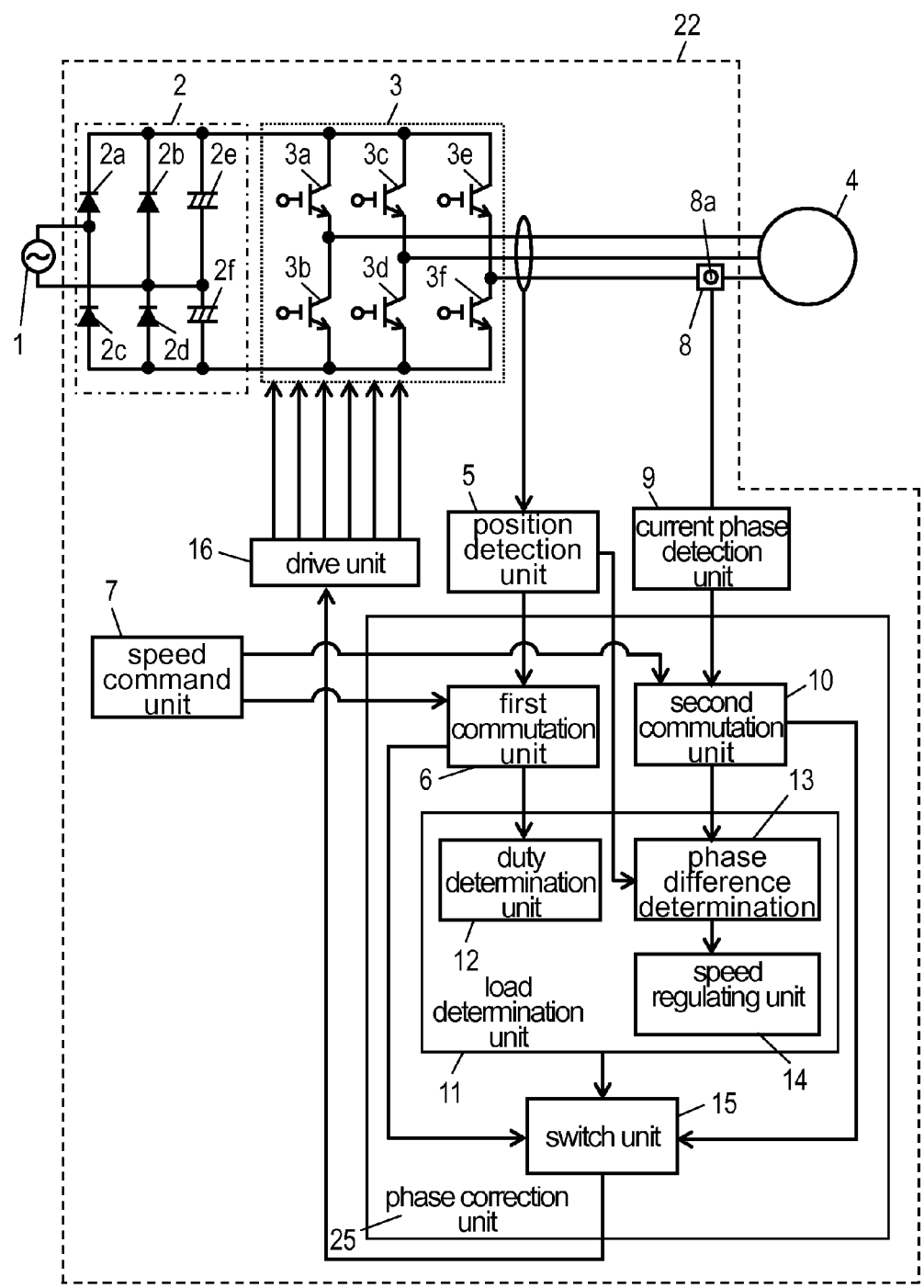
FIG. 1 is a block diagram showing a motor drive device in accordance with a first exemplary embodiment of the present invention.

FIG. 1 is a block diagram showing a motor drive device in accordance with a first exemplary embodiment of the present invention. In FIG. 1, power supply 1 is a general commercial power supply. In Japan, it is a 50 Hz or 60 Hz AC power supply having an effective value of 100 V. Motor drive device 22 is connected to power supply 1 and drives brushless DC motor 4. Hereinafter, motor drive device 22 is described.

Rectifying and smoothing circuit 2 receives an input from power supply 1 and rectifies and smoothes AC electric power to DC electric power. Rectifying and smoothing circuit 2 includes four bridge-connected rectifier diodes 2a to 2d, and smoothing capacitors 2e and 2f. Inverter 3 includes six switching elements 3a to 3f which are coupled via a three-phase full bridge. Inverter 3 converts DC electric power from rectifying and smoothing circuit 2 into AC electric power, and supplies AC electric power of any voltage and frequency to brushless DC motor 4. Brushless DC motor 4 includes a rotor having a permanent magnet and a stator having three-phase star connected windings (three-phase windings).

Current detection unit 8 detects a phase current of brushless DC motor 4. In the exemplary embodiment, current detection unit 8 is installed between the output of inverter 3 and the winding of the stator. One method for detecting a phase current is a method of installing a shunt resistor between lower-side switching elements 3b, 3d and 3f of inverter 3 and an inverter input N side, that is, an anode side of diodes 2c and 2d of rectifying and smoothing circuit 2, and detecting a current from a voltage generating in the shunt resistor. However, since loss by the shunt resistor may occur, a low-loss configuration may be employed by using a current sensor instead of using the shunt resistor.

Current phase detection unit 9 detects a phase of the phase current from the output of current detection unit 8. A phase in which a current of the motor is maximum or minimum is preferably detected from any one phase of winding in the three-phase windings of the stator of brushless DC motor 4. Alternatively, as an easier and simpler method, timing of a specific phase, for example, zero crossing timing of a current flowing in any one phase of winding may be detected.

Phase correction unit 25 outputs a signal indicating the timing of switching a winding to be energized in brushless DC motor 4, that is, a commutation signal so that a predetermined relation is maintained between the phase of the current flowing through brushless DC motor 4 and the phase of a voltage. Herein, the phase of the current flowing through brushless DC motor 4 can be obtained from current phase detection unit 9. The output of the commutation signal may be based on any timing based on the phase of the current flowing through brushless DC motor 4. Therefore, the commutation signal may be output by using a detection result of current phase detection unit 9 based on zero crossing timing of the current, which can be detected easily and reliably.

Drive unit 16 outputs a drive signal indicating supplying timing of electric power to be supplied by inverter 3 to brushless DC motor 4 based on the commutation signal output from phase correction unit 25. With this drive signal, switching elements 3a to 3f of inverter 3 are turned on and off. Thus, brushless DC motor 4 is driven. Note here that motor drive device 22 in this exemplary embodiment does not particularly detect a position of the rotor of brushless DC motor 4.

Figure 2A:
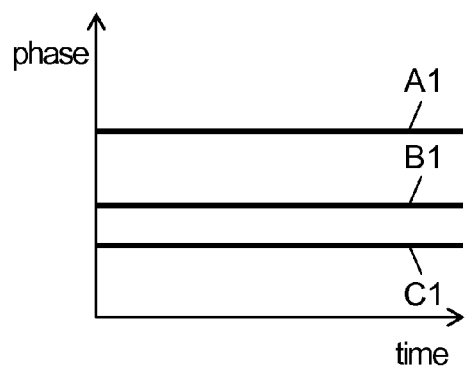
FIG. 2A is a graph to illustrate a phase relation of the motor drive device of the exemplary embodiment.
Figure 2B:
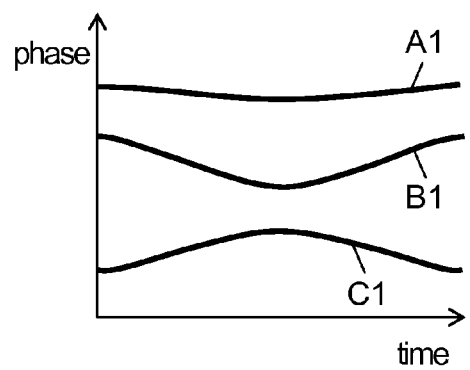
FIG. 2B is a graph to illustrate another phase relation of the motor drive device of the exemplary embodiment.

Next, a phase of a current flowing through brushless DC motor 4 and a phase of a voltage, which are maintained as a predetermined relation by phase correction unit 25, are described with reference to drawings. FIGS. 2A and 2B are graphs to illustrate an operation in the present invention, showing the phase relation between a phase current and a terminal voltage of brushless DC motor 4 when brushless DC motor 4 is open-loop driven by a synchronous drive circuit.

In FIGS. 2A and 2B, the abscissa shows time, and the ordinate shows a phase based on a phase of an induced voltage (that is, a phase difference with respect to the induced voltage). In both drawings, line A1 shows the phase of a phase current; line B1 shows the phase of a terminal voltage, and line C1 shows the phase difference between the phase current and the terminal voltage. FIG. 2A shows a stable drive state under low-load conditions; and FIG. 2B shows a state of a drive limit in a motor drive device. Furthermore, both FIGS. 2A and 2B show that the phase of the current leads with respect to the phase of the terminal voltage, showing that the brushless DC motor is driven at an extremely high speed and is in a state in which the induced voltage is high.

As shown in FIG. 2A, in the case of a stable drive state in a synchronous drive, the rotor is delayed with respect to the commutation by an angle corresponding to a state of a load. That is to say, seen from the rotor, the commutation is a leading phase, and a predetermined relation is kept. In other words, seen from the induced voltage, the phases of voltage and current are leading phases, and a predetermined relation is kept. This is the same as a state of a magnetic flux weakening control, and thus a high-speed drive is possible.

On the other hand, as shown in FIG. 2B, when a load is large with respect to a drive speed, the rotor is delayed with respect to the commutation, and thereby a magnetic flux weakening state occurs and the rotor is accelerated in synchronization with the commutation cycle. Thereafter, a lead angle of the current is reduced by the acceleration of the rotor, and this time, the rotor is decelerated. This state is repeated, and the rotor repeats acceleration and deceleration. This results in an unstable drive state (drive speed). That is to say, as shown in FIG. 2B, the rotation of the brushless DC motor changes with respect to the commutation carried out in a constant cycle. Therefore, with reference to the phase of the induced voltage, the phase of the terminal voltage changes and a drive state becomes unstable. This is because when the rotor of the motor is out of synchronization, the position cannot be understood because of open-loop drive, so that the phase of the terminal voltage (that is, commutation timing) cannot be fixed with respect to the induced voltage. Therefore, in order to stabilize the drive in a synchronous drive state, the phase relation between the phase of the induced voltage and the phase of the terminal voltage is preferably fixed. Phase correction unit 25 outputs a commutation signal that holds such a predetermined relation. In other words, phase correction unit 25 outputs a commutation signal for making the phase difference (line C1) between the phase of a current (line A1) and the phase of a voltage (line B1) constant.

Phase correction unit 25 may output a commutation signal for making the phase difference constant by correcting the energization time for any one phase of winding of the three-phase windings of brushless DC motor 4. This is particularly effective when a load of the brushless DC motor 4 has high inertia. In a load whose inertia is large, since the change in the speed for a short time is extremely small, even if a signal for making a phase difference constant by correcting the time of energization for any one phase of winding is output, the change in the speed is not increased, and stable driving performance can be obtained. Thus, a load range in which driving can be driven is extended.

Figure 3:
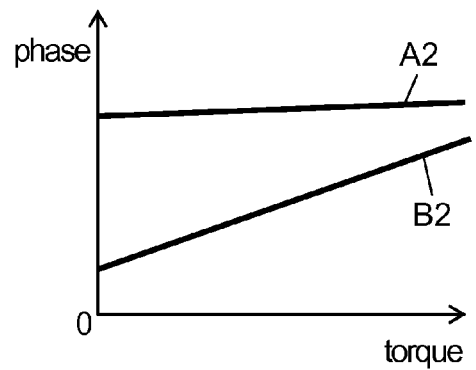
FIG. 3 is a graph showing a relation between toque and a phase of a brushless DC motor in the exemplary embodiment.

FIG. 3 is a graph showing a relation between torque and a phase when brushless DC motor 4 is driven synchronously. In FIG. 3, the abscissa shows motor torque, and the ordinate shows a phase difference based on the phase of the induced voltage. When the phase is positive, the phase leads with respect to the phase of the induced voltage. Furthermore, in FIG. 3, line A2 shows the phase of the current of brushless DC motor 4, and line B2 shows the phase of the terminal voltage, showing a stable state in the synchronous drive. Since the phase of the current leads with respect to the phase of the terminal voltage, it is shown that the drive is carried out in a state in which the induced voltage is high and speed is high.

As is apparent from the relation between the phase of the phase current and the phase of the terminal voltage shown in FIG. 3, the change in the phase of the current with respect to the load torque is extremely small. On the other hand, since the phase of the terminal voltage changes linearly, the phase difference between the current and the voltage changes substantially linearly according to the load torque. Herein, as described above, in a state in which the drive is stable in synchronous drive, as shown in FIG. 2A, the relation of the induced voltage, the current of the motor, and the phase of the terminal voltage is kept constant and is stable. That is to say, the phase of the current of the motor and the phase of the terminal voltage are balanced in an appropriate phase relation according to the load. Therefore, in particular, in the drive under high-speed and high-load conditions, as shown in FIG. 3, by maintaining and fixing the phase of the current and the phase of the voltage of the motor in an appropriate relation according to the load, a phenomenon of repeating acceleration and deceleration, which occurred in a conventional motor drive device, can be avoided, so that a drive range can be further extended.

Second Exemplary Embodiment

A motor drive device in accordance with a second exemplary embodiment of the present invention is described with reference to, for example, FIG. 1. Note here that the same components as those described in the first exemplary embodiment are described with the same reference numerals given.

In FIG. 1, power supply 1, rectifying and smoothing circuit 2, inverter 3, and brushless DC motor 4 are the same components as those in the first exemplary embodiment. Position detection unit 5 detects a relative position of a rotor of brushless DC motor 4. As a method for detecting the relative position of the rotor of brushless DC motor 4, any methods can be employed. Examples of the method for detecting a zero-crossing point of an induced voltage generated by rotation of brushless DC motor 4 include a well-known method of comparing the size of a voltage of an output terminal of inverter 3 and ½ of a DC voltage of inverter 3 with each other and detecting timing at which the size relation therebetween is reversed in the off period of inverter 3 in the both upper-side and lower-side switching elements (for example, switching elements 3a and 3b of a U-phase) of arbitrary phases.

First commutation unit 6 decides commutation timing of brushless DC motor 4 based on feedback control, and outputs it as a first commutation signal. Speed command unit 7 indicates the drive speed of brushless DC motor 4. First commutation unit 6 detects a present drive speed of brushless DC motor 4 from the generation cycle of a position signal obtained by position detection unit 5, and decides a voltage to be applied to inverter 3 and application timing, that is, commutation timing, from the deviation between the detected drive speed and a command speed indicated by speed command unit 7. Specifically, in 120-degree rectangular wave drive, in the case where a voltage is applied at the timing when an electric angle of 30 degrees has passed from the detection point of the zero-crossing point (that is, a position detection point), the induced voltage and the terminal voltage are in the same phase. The optimum timing can be obtained by regulating voltage application timing from the position detection timing based on the types and properties of the motor or the load state. Furthermore, the voltage value can be regulated easily by PWM control. The PWM control increases a PWM duty so as to increase an applied voltage when the drive speed is slower than the command speed, and decreases the duty when the drive speed is faster than the command speed. Thus, a voltage applied to brushless DC motor 4 is regulated, resulting in controlling the speed of brushless DC motor 4. Thus, feedback control by detection of an induced voltage is carried out.

Current detection unit 8 detects a phase current, and is installed between the output of inverter 3 and the winding of the stator. Examples of the method of detecting a phase current includes, as in the first exemplary embodiment, a method for detecting from a voltage of a current-detecting shunt resistor, but due to resistance, a loss is increased. Therefore, in this exemplary embodiment, current sensor 8a is used, and thereby loss increase hardly occurs. Thus, it is possible to achieve highly efficient motor drive device 22.

Current phase detection unit 9 detects a phase of a phase current from an output of current detection unit 8 as in the first exemplary embodiment, but a phase in which a current of the motor reaches maximum or minimum is preferably detected from any one phase of winding of the three-phase windings of the stator of brushless DC motor 4. This contributes to miniaturization and cost reduction of motor drive device 22. Alternatively, as an easier and simpler method, timing of a specific phase, for example, zero crossing timing of a current flowing in any one phase of winding may be detected. Furthermore, in this exemplary embodiment, current information obtained by current detection unit 8 is used for detecting a phase of a current, but not for detecting a current value. Therefore, it is not necessary to use highly accurate current detection unit 8 such as a DC sensor. Therefore, in this exemplary embodiment, by using an extremely low-cost AC sensor 8a for detecting a subject to be measured via a secondary winding that is wound n times, the cost of motor drive device 22 is reduced.

In the selection of AC sensor 8a, by using a general commercial power supply (50 Hz or 60 Hz), the cost can be further reduced. Furthermore, AC sensor 8a in this exemplary embodiment is not used for detecting an electric value but for detecting zero crossing timing. Therefore, since the output accuracy is not particularly required, selection based on the output accuracy is not required, thereby improving the yield. Also in this point, low cost components can be selected. As to the frequency characteristics, the change of the output accuracy with respect to current frequency is not a problem, but it is natural to select a type capable of reliably obtaining specific phase stably from minimum frequency to maximum frequency.

Furthermore, in this exemplary embodiment, as a phase of an arbitrary phase current, the zero-crossing point of the phase current is detected. Thus, the output of AC sensor 8a is input into an AD converter such as microcomputer so as to detect a point at which the polarity of current is reversed (that is, the direction is reversed) by regular (for example, every 20 μs) digital sampling, and thereby, the detection of the zero-crossing point can be easily achieved by software. Furthermore, in hardware, this can be easily carried out by inputting an output of AC sensor 8a into a photocoupler, and detecting a rising edge and a falling edge of a signal output from the photocoupler.

Even when a predetermined displacement occurs in detection timing due to variation of constants of hardware, or installment of a noise-removing filter in detection of zero crossing, in the motor drive device of the present invention, only an arbitrary reference phase of the current of the motor is determined. Therefore, in this exemplary embodiment, a motor drive device having an extremely small effect of circuit variation and the like can be achieved.

Second commutation unit 10 decides commutation timing of brushless DC motor 4, and outputs it as a second commutation signal. The second commutation signal is decided based on the drive speed of the motor, which is indicated by speed command unit 7, and a predetermined duty, with reference to any phase of a phase current detected by current phase detection unit 9.

Load determination unit 11 determines a load state of brushless DC motor 4. Load determination unit 11 includes duty determination unit 12 for determining a state of a PWM duty, phase difference determination unit 13 for determining a phase relation between a position detection timing and the second commutation signal generated by the second commutation unit, and speed regulating unit 14 for regulating a speed of brushless DC motor 4 from phase difference determination unit 13.

Switch unit 15 switches between a first commutation signal by first commutation unit 6 and a second commutation signal by second commutation unit 10 based on the determination result of a load state by load determination unit 11. In other words, switch unit 15 switches between the first commutation signal and the second commutation signal as a signal to be employed as a signal indicating timing for switching a winding that allows a current to flow through brushless DC motor 4.

Drive unit 16 outputs a drive signal based on the timing of the first commutation signal or the second commutation signal, which is switched by switch unit 15, and turns switching elements 3a to 3f of inverter 3 on and off. Thus, brushless DC motor 4 is driven.

Figure 4:
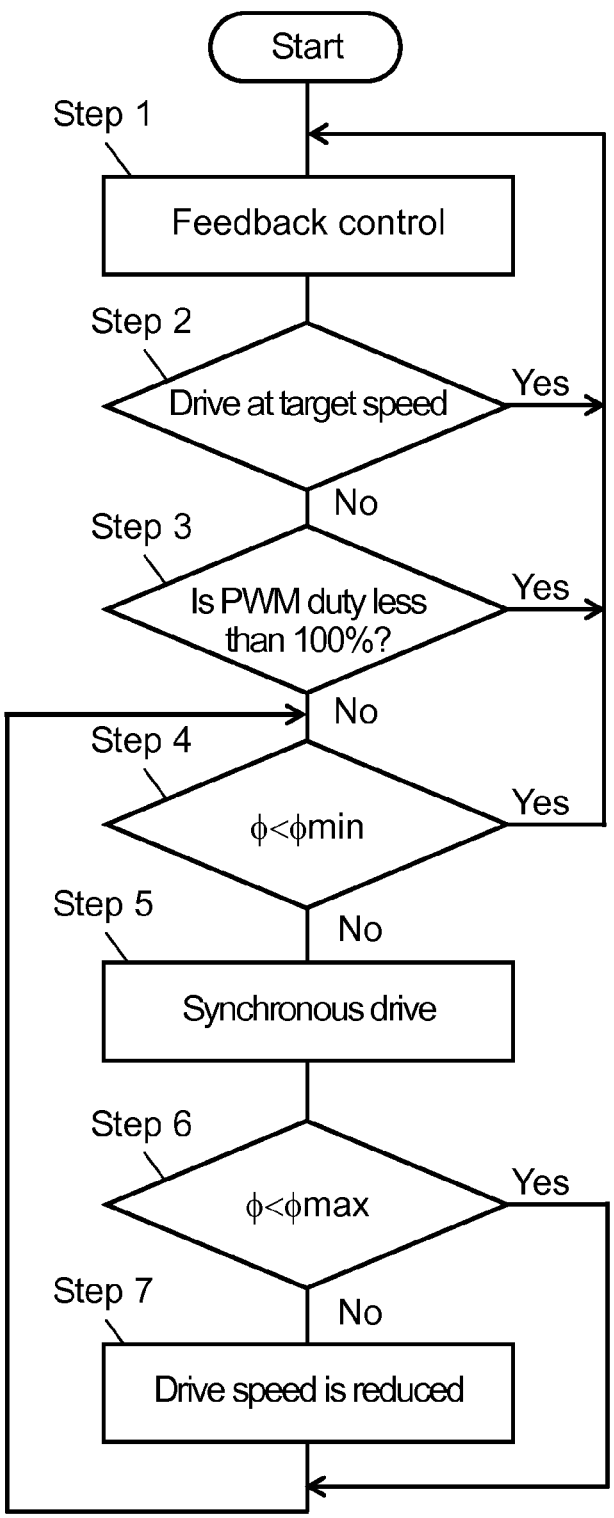
FIG. 4 is a flowchart showing an operation of a motor drive device in accordance with a second exemplary embodiment of the present invention.

An operation of motor drive device 22 configured as mentioned above is described. FIG. 4 is a flowchart showing an operation in accordance with this exemplary embodiment. In FIG. 4, steps 1 to 3 are steps of drive under low-load conditions in which feedback control is carried out by first commutation unit 6. On the other hand, steps 4 to 7 are steps of drive under high-load conditions in which drive by first commutation unit 6 is limited, in which synchronous drive based on second commutation unit 10 is carried out. Firstly, operations of steps 1 to 3, that is, feedback control by first commutation unit 6 is described.

In FIG. 4, firstly, in step 1, speed control is carried out by PWM feedback control aiming at a speed indicated by speed command unit 7. Note here that speed command unit 7 sets and indicates an appropriate target speed based on drive environment or a state of brushless DC motor 4. The PWM feedback control controls commutation timing so as to achieve the most efficient drive state for carrying out position detection feedback control. Next, in step 2, it is confirmed whether or not the drive speed reaches the target speed. When the drive speed reaches the target speed, in other words, when the drive is carried out at the target speed (Yes in step 2), the procedure returns to step 1. When the drive speed does not reach the target speed (No in step 2), the procedure goes to step 3. In step 3, duty determination unit 12 in load determination unit 11 confirms whether or not the PWM duty reaches the maximum duty (in general, 100%). When the PWM duty is less than 100% (Yes in step 3), since the speed control by PWM duty control can be carried out, the procedure returns to step 1. Herein, when the PWM duty reaches the maximum (No in step 3), a voltage supplied to brushless DC motor 4 cannot be increased further. That is to say, the state is a limit load state in the drive based on first commutation unit 6.

In this way, when the drive based on first commutation unit 6 reaches the limit, switch unit 15 switches the first commutation unit to the second commutation unit 10. Thus, brushless DC motor 4 is driven based on second commutation unit 10. Steps later than this correspond to those later than step 4 in FIG. 4, but the drive based on second commutation unit 10 is described first.

The basic concept as to a second commutation signal to be output by second commutation unit 10 is the same as that described with reference to FIGS. 2A, 2B and 3 in the first exemplary embodiment. Specifically, the concept is to keep the phase difference between a phase of a current of brushless DC motor 4 and a phase of a terminal voltage constant, in other words, to stabilize the phase difference.

Figure 5:
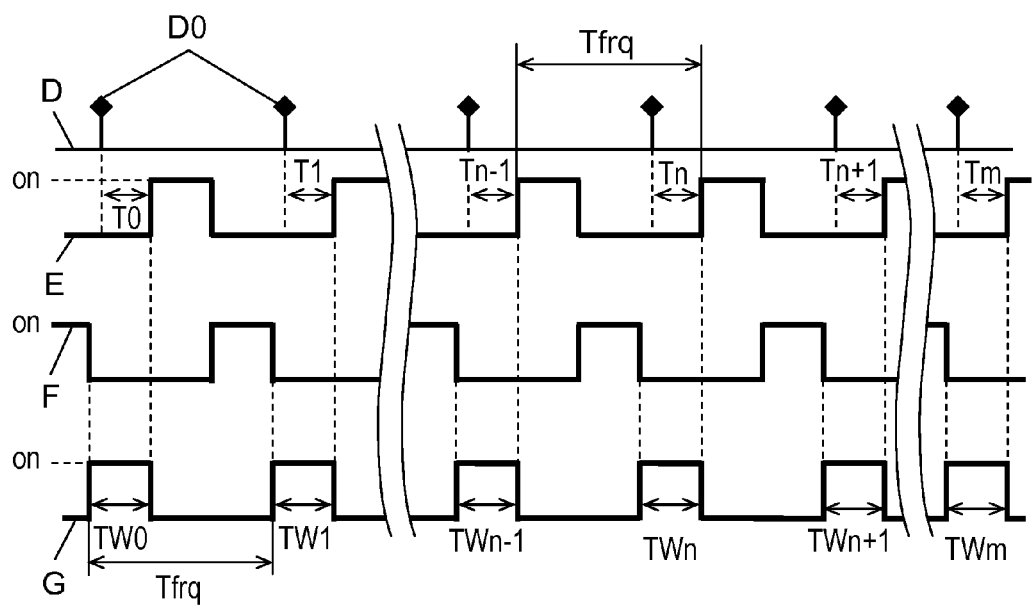
FIG. 5 is a timing chart of a second commutation unit of the motor drive device in the exemplary embodiment.

Herein, an operation for stabilizing the phase difference between the phase of the current of brushless DC motor 4 and the phase of the terminal voltage according to the load state is described. FIG. 5 is a timing chart of commutation timing by second commutation unit 10 in this exemplary embodiment. In FIG. 5, signal D shows timing of the reference phase of a U-phase current, in particular, the point at which the polarity of the U-phase current is changed from negative to positive, in other words, zero-crossing point D0. Signals E, F, and G show on/off states of the upper-side switching elements 3a, 3c, and 3e of the U, V and W-phases, respectively. Note here that energization is 120-degree rectangular wave energization. Commutation cycle Tfrq is a constant cycle based on the command speed by speed command unit 7 in synchronous drive based on second commutation unit 10, and the commutation is repeated in this cycle.

Each of time T0 to Tm is a time from the reference phase of a phase current to the commutation of an arbitrary phase, and second commutation unit 10 always measures this time. In this exemplary embodiment, this time is a time from the U-phase zero-crossing point to the time when U-phase upper-side switching element 3a is turned on. Each of time TW0 to TWm is a time during which an arbitrary switching element in an arbitrary phase is turned on, in other words, an energization time. In this exemplary embodiment, this time is an energization time of W-phase upper-side switching element 3e.

Figure 6:
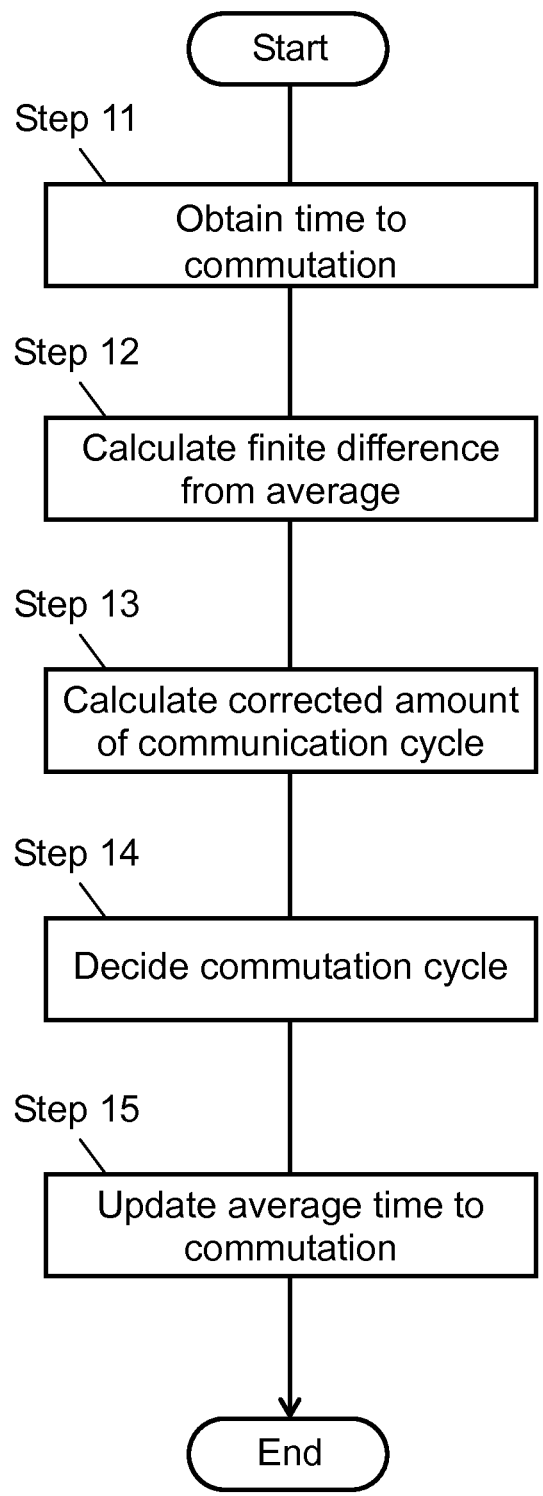
FIG. 6 is a flowchart showing an operation of the second commutation unit of the motor drive device in the exemplary embodiment.

Herein, an operation of deciding the timing of this commutation is described with reference to FIG. 6. FIG. 6 is a flowchart showing second commutation unit 10 of motor drive device 22 in this exemplary embodiment.

Firstly, in step 11, time Tn from the reference current phase to the commutation of an arbitrary phase is obtained. In this exemplary embodiment, time Tn is a time from the U-phase zero-crossing point to the time when U-phase upper-side switching element 3a is turned on. In step 12, the obtained time Tn is compared with the average time Tav of the past n pieces of data (T0 to Tn−1) and the finite difference is calculated. In step 13, a corrected amount of the communication cycle is calculated based on the calculated finite difference. The calculation of the corrected amount is decided by using an optimum correction formula or the like, from the motor characteristics, load characteristics, or the like, for example, by obtaining ½ of the finite difference. In step 14, based on the corrected amount calculated in step 13, the commutation cycle of an arbitrary phase is decided by adding the corrected amount to the commutation cycle in synchronous drive. In this exemplary embodiment, energization time TWn+1 of W-phase upper-side switching element 3e, that is, a time until switching element 3a is turned on after switching element 3c is turned off, is decided. In step 15, by considering data Tn obtained this time, average time Tav from the reference phase of a phase current to the commutation cycle of an arbitrary phase is updated.

Since the corrected amount of the commutation cycle is decided as mentioned above, when the load and the like is stable and the drive of brushless DC motor 4 is in a stable state, the finite difference between obtained data Tn and average time Tav of past n times becomes extremely small. In other words, as shown in FIG. 3, the corrected amount of the commutation timing becomes an extremely small value, so that correction is hardly carried out and the phase relation is stabilized.

On the other hand, when the load is increased from the state in which the drive is stable, the rotation of the rotor is delayed with respect to the commutation cycle as mentioned above. In other words, as shown in FIG. 3, the phase difference between the phase of the phase current and the phase of the terminal voltage decreases, and time Tn in FIG. 5 is shortened. Therefore, Tn is smaller with respect to Tav, and the finite difference between Tav and Tn increases. In this case, the commutation cycle is brought near to the rotation of the rotor. That is to say, the phase of the phase current and the phase of the terminal voltage are always kept constant. In this exemplary embodiment, the corrected amount based on the finite difference between Tav and Tn is added in the direction in which the commutation cycle of the W-phase is delayed (that is, an energization time of the W-phase upper-side switching element 3e is extended). In this case, correction of commutation of other phases is not carried out, and the commutation based on the command speed is repeated. This is an operation of bringing time Tm from the reference phase of the phase current to the commutation near to average time Tav.

Therefore, the load is increased and the rotor starts to be delayed with respect to the commutation, so that the phase difference between the phase of the phase current and the phase of the terminal voltage is reduced, and Tm is shortened.

Thus, Tav as a reference of the corrected amount of the commutation timing is gradually shortened. Consequently, Tm and Tav are balanced, the relation between the phase of the phase current and the phase of the terminal voltage according to the load state is kept, and an appropriate current and a voltage lead angle are obtained, so that the drive state becomes stable.

When the load is reduced, the finite difference between Tav and Tn is increased in sign opposite to the time when the load is increased. Therefore, although the correction of the commutation timing is carried out in the direction of the opposite sign, it is similar to an operation at the time when the load is increased.

In this way, according to the load state, by correcting the commutation timing so that the phase relation between the phase current and the terminal voltage is held in an appropriate state, it is possible to maintain the relation of the phase of the induced voltage of the motor (that is, the rotation of the motor), the phase of the phase current, and the phase of the terminal voltage in an appropriate state. As a result, the stability of drive of brushless DC motor 4 under high-speed and high-load conditions can be improved, and driving performance under high-speed and high-load conditions can be increased.

As mentioned above, when, brushless DC motor 4 is driven under low-speed and low-load conditions in which the PWM duty is less than 100% (Yes in step 3 in FIG. 4), the speed control based on the relative position of the rotor by first commutation unit 6 is carried out by PWM feedback control, and thereby highly efficient drive can be carried out. On the other hand, when brushless DC motor 4 is driven under high-speed and high-load conditions, the PWM duty is 100% (No in step 3 in FIG. 4), and the load state is a state that cannot be driven at the target speed by first commutation unit 6. In this state, it is possible to carry out high torque drive by drive control maintaining the phase relation in which the phases of the phase current and the terminal voltage are allowed to correspond to the load state. Thus, it is possible to achieve driving performance under high-speed and high-load conditions in which a drive range is extended and which are stable and are not susceptible to external disturbance as compared with a conventional motor drive device.

Furthermore, in this exemplary embodiment, by carrying out position detection of a phase current in only one phase, the cost performance of motor drive device 22 is improved. On the other hand, when the commutation timing correction of the detection of the phase of the phase current is carried out by obtaining phase information of two phases or all three phases, more sensitive correction control can be carried out.

Next, an operation of phase difference determination unit 13 of load determination unit 11 is described. Even when synchronous drive based on second commutation unit 10 is carried out, there is drivable torque has limitations. When the torque is beyond the limitation, brushless DC motor 4 loses synchronism. Therefore, in order to improve the reliability of the motor drive device of this exemplary embodiment, a failsafe operation is added before stopping by the out-of-synchronism.

Figure 7:
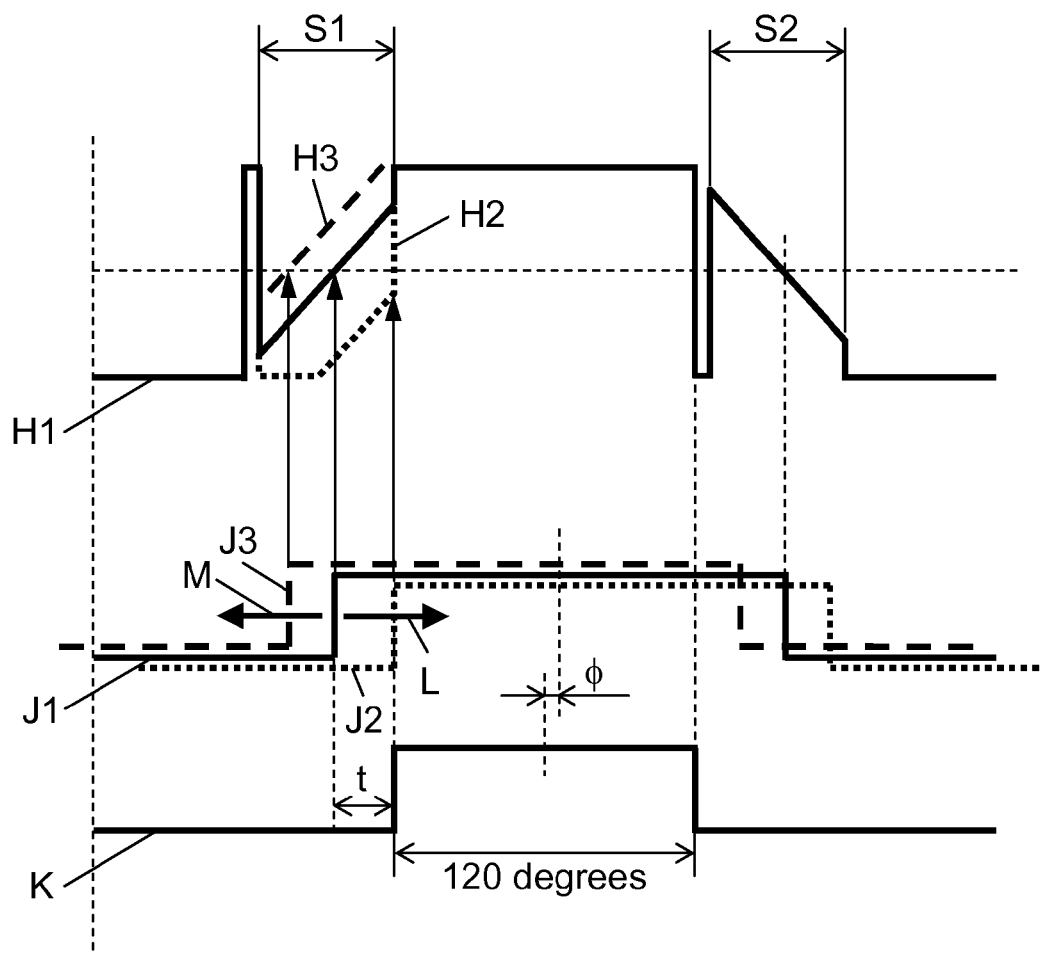
FIG. 7 is a timing chart of a position detection unit of the motor drive device in the exemplary embodiment.

Herein, the failsafe operation is described with reference to FIG. 7. FIG. 7 is a timing chart of an output signal of position detection unit 5 when brushless DC motor 4 is driven. Waveform H1 in FIG. 7 is a waveform of a terminal voltage of the U-phase. Signal J1 is an output signal of the U-phase of position detection unit 5. Signal K is a drive signal on the U-phase. Furthermore, intervals S1 and S2 are intervals during which the upper-side and lower-side switching elements of the U-phase are turned off, and an induced voltage, in which ½ of the inverter input voltage is zero crossing, appears. In this exemplary embodiment, the U-phase is described, but the same is true in V-phase and W-phase although the phases are displaced by ±120°.

In the drive based on second commutation unit 10, regardless of a signal of position detection unit 5, brushless DC motor 4 is driven by synchronous drive that repeats commutation in a constant duty and constant timing. Therefore, when the load is increased or the load is large, the rotor of brushless DC motor 4 rotates with a bit of delay with respect to the commutation. In other words, the phase of the terminal voltage is a leading phase with reference to the induced voltage. In this case, waveform H1 (induced voltage) of an original terminal voltage is shifted downward as shown in waveform H2. Thus, output signal J1 of position detection unit is also shifted in the right direction according to arrow L as shown in signal J2. On the contrary, when the load is decreased or the load is small, the rotor of brushless DC motor 4 rotates with a bit of leading with respect to the commutation. In other words, a phase of the terminal voltage becomes a delayed phase with reference to the induced voltage. In this case, waveform H1 of the original terminal voltage is shifted upward as shown in waveform H3. Thus, output signal J1 of position detection unit 5 is also shifted in the left direction according to arrow M as shown in signal J3.

Time t in FIG. 7 shows a time difference between the on-timing of the drive signal and a rising edge of the output signal of position detection unit 5. This includes information of the phase difference $\phi$ of both signals. For example, in the case of 120-degree energization, when an angle from the rising edge of the position detection signal to the commutation is 20°, the phase difference $\phi$ is 10°. In second commutation unit 10, as mentioned above, drive is carried out in the phase relation according to the load, and in a stable and appropriate lead angle state. Thus, the phase relation between the drive signal and the signal of position detection unit 5 (that is, the induced voltage) is changed according to the load. Therefore, from the phase difference between the drive signal and the signal of position detection unit 5, the load state of brushless DC motor 4 can be obtained.

Herein, back to FIG. 4, procedures later than step 4 are described. That is to say, the case in which the PWM duty reaches the maximum, in other words, the PWM duty is 100% in step 3 (No in step 3) is described.

In the drive based on second commutation unit 10, phase difference determination unit 13 determines by comparing the phase difference $\phi$ between a drive signal in the U-phase and a U-phase output signal in position detection unit 5 with a predetermined value, that is, a predetermined minimum phase difference $\phi$ min (step 4). When this phase difference is the predetermined minimum phase difference $\phi$ min or more (No in step 4), synchronous drive based on second commutation unit 10 is carried out in step 5. Furthermore, in step 6, phase difference determination unit 13 determines by comparing the phase difference $\phi$ with a predetermined value, that is, a predetermined maximum phase difference $\phi$ max. When this phase difference $\phi$ is smaller than the predetermined maximum phase difference $\phi$ max (Yes in step 6), the procedure returns to step 4. On the other hand, this phase difference $\phi$ is larger than a predetermined maximum phase difference $\phi$ max (No in step 6), speed regulating unit 14 reduces the output of brushless DC motor 4, thereby reducing the target rotation rate so as to reduce the drive speed (step 7). In this way, stop due to the out-of-synchronism is avoided so as to improve the reliability of the motor drive device. After the drive speed is reduced in step 7, the procedure returns to step 4.

On the other hand, a case in which a load state is extremely light in the drive based on second commutation unit 10 is described. In this case, since the phase difference φ is smaller than a predetermined minimum phase difference φ min (Yes in step 4), the procedure returns to step 1. This means that it is determined that position detection feedback control by first commutation unit 6 is possible. Specifically, it is determined that the drive is in a load state in which drive based on first commutation unit 6 becomes possible, the second commutation signal is switched to the first commutation signal by switch unit 15. In other words, brushless DC motor 4 is shifted from the synchronous drive control to drive by position detection feedback control. Thus, the load is reduced at the time of drive in second commutation unit 10. When a state becomes a load state in which drive in first commutation unit 6 is possible, this timing is appropriately detected, and drive can be switched to a highly efficient drive in first commutation unit 6.

As mentioned above, motor drive device 22 in this exemplary embodiment carries out drive of brushless DC motor 4 based on the first commutation signal by first commutation unit 6 in the drive under low-speed and low-load conditions, and drive of brushless DC motor 4 based on a second commutation signal by second commutation unit 10 in the drive under high-speed and high-load conditions. Therefore, a drive range of brushless DC motor 4 can be extended. In particular, the stability of the drive under high-speed and high-load conditions is improved. Thus, a load range of brushless DC motor 4 can be extended. Furthermore, since a highly efficient motor can be driven even in high-speed and high-load conditions, power consumption of the device can be reduced.

Figure 8:
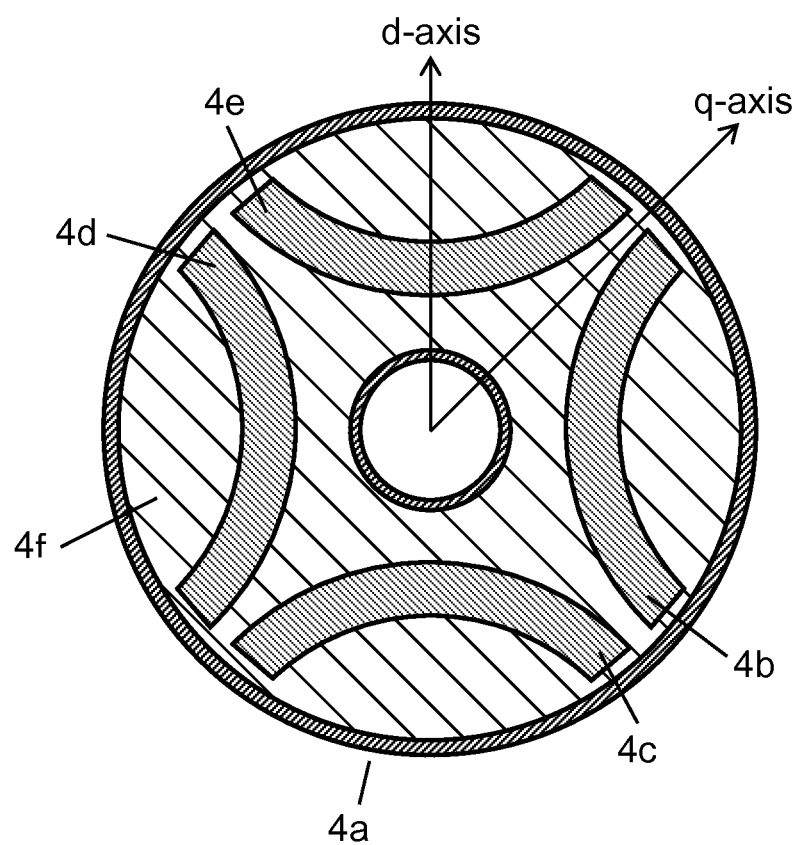
FIG. 8 is a sectional view showing a principal part of a brushless DC motor in the exemplary embodiment.

Next, a structure of brushless DC motor 4 in accordance with this exemplary embodiment is described. FIG. 8 is a sectional view showing a section perpendicular to the rotation axis of the rotor of brushless DC motor 4 in this exemplary embodiment.

Rotor 4a includes core 4f and four magnets 4b to 4e. Core 4f is formed by laminating punched silicon steel plates having a thin thickness of about 0.35 to 0.5 mm. Magnets 4b to 4e are embedded in core 4f. For magnets 4b to 4e, circular arc-shaped ferrite permanent magnets are often used. As shown in FIG. 8, the magnets are disposed symmetrically with respect to the center so that the circular arc-shaped concave portions face outward. On the other hand, for magnets 4b to 4e, a permanent magnet made of rare earth such as neodymium is used, magnets 4b to 4e may have a flat plate shape.

In rotor 4a having such a structure, an axis extending from the center of rotor 4a to the center of one magnet (for example, 4e) is defined as a d-axis, and an axis extending from the center of rotor 4a to a place between one magnet (for example, 4e) and the adjacent magnet (for example, 4b) is defined as q-axis. Inductance Ld in the d-axis direction and inductance Lq in the q-axis direction have inverse saliency, and they are different from each other. This means that, as a motor, other than torque by a magnet flux (magnet torque), torque using inverse saliency (reluctance torque) can be efficiently used. Therefore, as a motor, the torque can be used more efficiently. As a result, in this exemplary embodiment, highly efficient motor can be obtained.

Furthermore, when a control in this exemplary embodiment is carried out, in the case where the drive based on second commutation unit 10 is carried out, the phase of the current is a leading phase. Therefore, since the reluctance torque is largely used, the motor can be driven at a higher rotation speed as compared with a motor without inverse saliency.

Brushless DC motor 4 in this exemplary embodiment is a rotor made by embedding permanent magnets 4b to 4e in core 4f of rotor 4a, and has saliency. Furthermore, in addition to magnet torque of the permanent magnet, reluctance torque of saliency is used. Thus, not only the efficiency at a low speed but also high-speed driving performance is further improved. Furthermore, when a rare earth magnet such as neodymium is employed for a permanent magnet so as to increase the rate of the magnet torque, or the difference between inductances Ld and Lq is increased so as to increase the rate of the reluctance torque, the efficiency can be increased by changing an optimum energization angle.

Furthermore, for example, brushless DC motor 4 is occasionally required to be driven under low-load conditions for most of the time, and driven under high-load conditions temporarily. Even in such a case, brushless DC motor 4 is required to be used in a wide range from low-load conditions to high-load conditions. In this case, in the frequently used low load conditions, it is possible to use brushless DC motor 4 designed to generate torque so that it can drive in first commutation unit 6 having duty of 100%. Thus, in most of the drive, that is, in the drive under low-load conditions, drive with small power consumption and high efficiency is carried out. Meanwhile, in the temporary drive under high-load conditions, drive in second commutation unit 10 is carried out. As a whole, high efficiency can be further achieved.

Third Exemplary Embodiment

Figure 9:
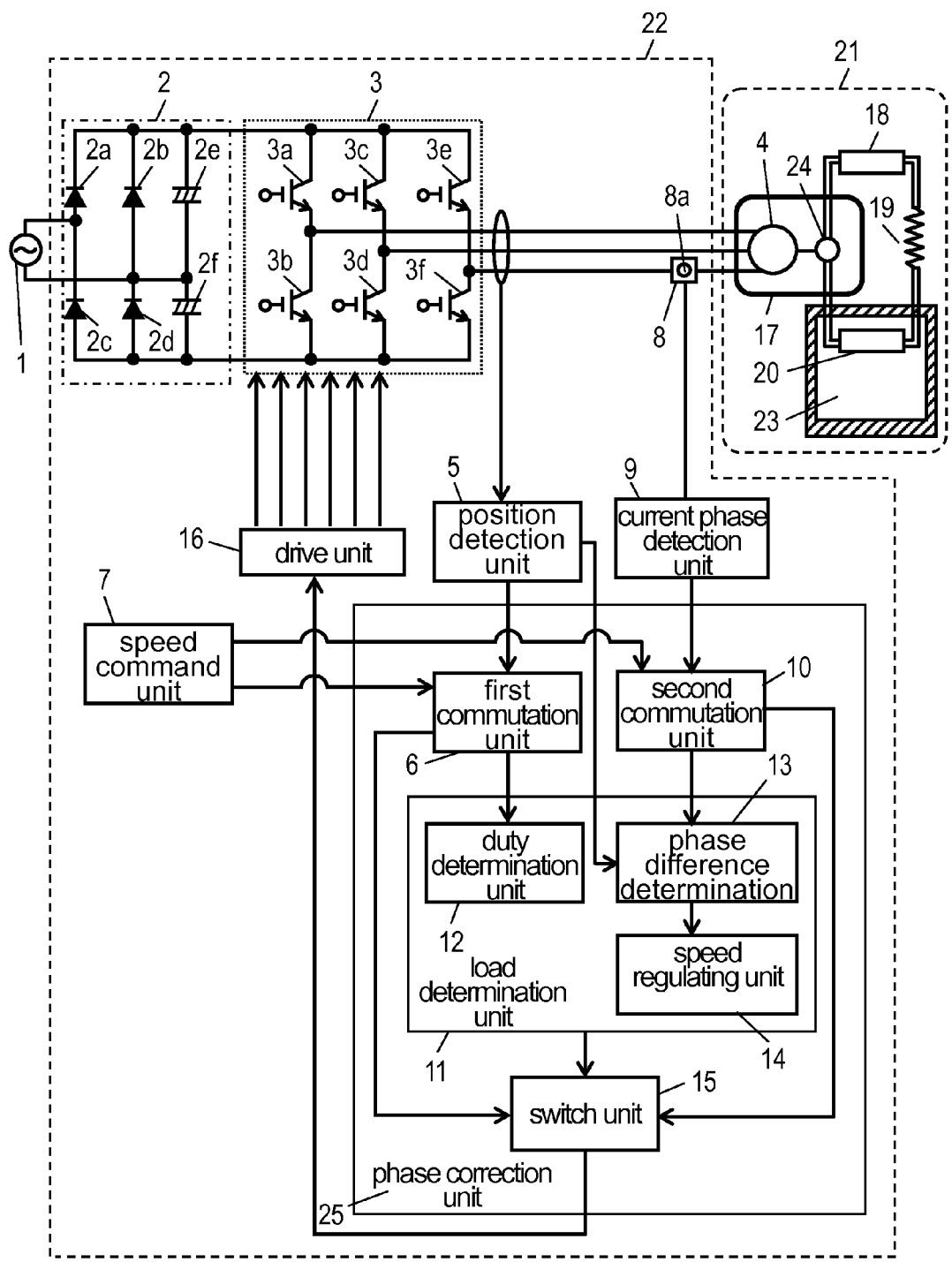
FIG. 9 is a block diagram showing a refrigerator provided with a motor drive device in accordance with a third exemplary embodiment of the present invention.
Figure 10:
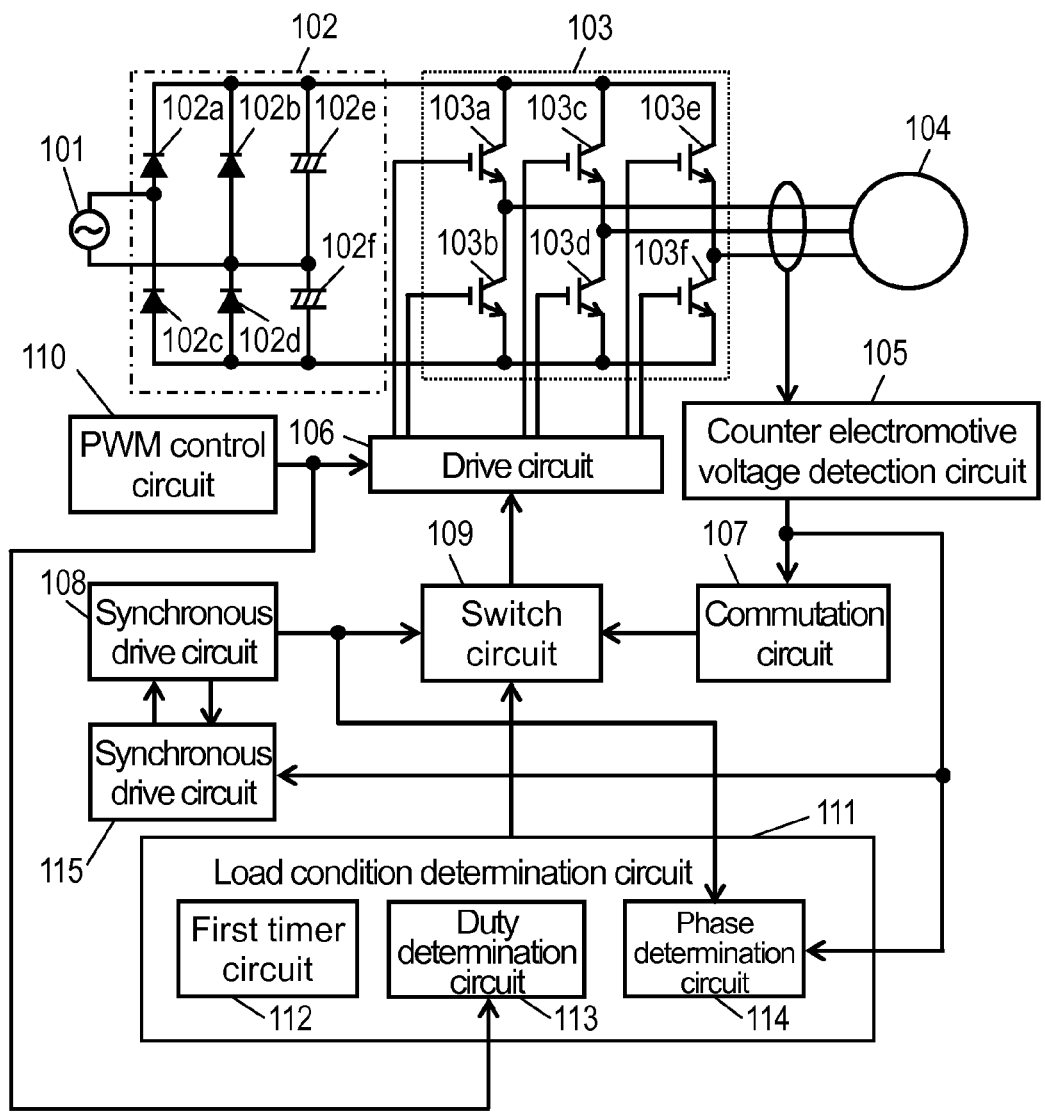
FIG. 10 is a block diagram showing a conventional motor drive device.

FIG. 9 is a block diagram showing a refrigerator using a motor drive device in accordance with a third exemplary embodiment of the present invention. In FIG. 9, the same components as those in FIG. 1 are described by using the same reference numerals.

Brushless DC motor 4 is connected to compression element 24 to form compressor 17. In this exemplary embodiment, compressor 17 is used in a refrigeration cycle. In other words, a high-temperature and high-pressure refrigerant discharged from compressor 17 is transmitted to condensation device 18, and it is liquefied, made to be low pressure in capillary tube 19, evaporated in evaporator 20, and returned to compressor 17 again. Furthermore, in this exemplary embodiment, the refrigeration cycle using motor drive device 22 is used for refrigerator 21, and evaporator 20 cools inside 23 of refrigerator 21.

In this way, in this exemplary embodiment, brushless DC motor 4 drives compression element 24 of compressor 17 of the refrigeration cycle. Herein, when compressor 17 is a reciprocating motion type (recipro type), in the configuration, a large-mass metallic crank shaft and a piston are connected to brushless DC motor 4, which makes a load with extremely large inertia. Therefore, the change in the speed for a short time is extremely small regardless of processes in the refrigeration cycle of compressor 17 (suction process, compression process, and the like). Therefore, even if commutation timing is decided based on a phase of a current of only one phase, the change in the speed is not become large, and thus stable driving performance can be obtained. Furthermore, in the control of compressor 17, highly accurate control of rotation rate or acceleration and deceleration control are not required. Therefore, motor drive device 22 of the present invention is one of the extremely useful applications with respect to drive of compressor 17.

Furthermore, as compared with the case in which a compressor is driven by a conventional motor drive device, a drive range can be extended. Therefore, driving at a higher speed can enhance refrigeration capacity of the refrigeration cycle.

Thus, a cooling system having the same configuration as conventional one can be applied for a system that requires higher refrigeration capacity. Therefore, a refrigeration cycle that requires high refrigeration capacity can be miniaturized, and can be provided at a low cost. Furthermore, in the refrigeration cycle using a conventional motor drive device, a compressor whose refrigeration capacity is smaller by one rank (for example, a compressor cylinder volume is small) can be used. Thus, a cooling cycle can be further miniaturized and cost reduction can be achieved.

In this exemplary embodiment, compressor 17 is used for cooling inside 23 of refrigerator 21. The refrigerator has use conditions in which the door is opened frequently in limited time, for example, in the hours of housework in the morning and in the evening, or in the summer season. On the contrary, most of the time in the day, the door is not opened frequently, and a cooling state in the inside of the refrigerator is stable. In this case, brushless DC motor 4 is driven under low-load conditions. Therefore, in order to reduce power consumption of refrigerators, it is effective to improve the driving efficiency of brushless DC motor under low-speed and low-load conditions.

Herein, in order to improve the driving efficiency under low-speed and low-load conditions, in other words, in order to reduce the power consumption in a brushless DC motor, the number of windings of a stator is increased. However, in this state, the brushless DC motor cannot correspond to the drive under high-speed and high-load conditions. On the other hand, in order to improve the driving performance of the brushless DC motor under high-speed and high-load conditions, the number of windings of the stator may be reduced, but the power consumption increases. In the present invention, since a drive range can be largely extended in brushless DC motor 4 under high-speed and high-load conditions, a brushless DC motor having a high driving efficiency under low-speed and low-load conditions and having small power consumption can be used. Thus, in a refrigerator, the driving efficiency of the brushless DC motor under low-load conditions in most of the day is improved, resulting in reducing the power consumption of a refrigerator.

Herein, design of the winding of the motor of brushless DC motor 4 used in refrigerator 21 in this exemplary embodiment is described. When drive is carried out at the rotation rate and in the load state which are used most frequently as refrigerator 21 (for example, the rotation rate is 40 Hz and the compressor input electric power is about 80 W), the winding is designed so that the duty is 100% at 120-150° energization by first commutation unit 6, iron loss of brushless DC motor 4 can be reduced and switching loss of inverter 3 can be reduced. Thus, the highest efficiency can be obtained in both motor efficiency and circuit efficiency. As a result, power consumption as refrigerator 21 can be minimized.

Furthermore, extending a drive range under high-speed and high-load conditions leads to the improvement of the refrigeration capacity of the refrigeration cycle. Therefore, in the high-load conditions in which the inside temperature is high, for example, when the door of the refrigerator is opened frequently, or after defrosting operation is carried out or immediately after the refrigerator is installed, and furthermore, or in rapid freezing operation carried out when hot foods are placed in the refrigerator and the foods are desired to be rapidly cooled or frozen, it is possible to cool the inside or foods for a shorter time as compared with refrigerators having a refrigeration cycle using a conventional motor drive device. Furthermore, since the refrigeration capacity of the refrigeration cycle is improved, a small refrigeration cycle can be used for a refrigerator having high capacity. Furthermore, since the refrigeration cycle is small, the inside volumetric efficiency (volume of a portion accommodating foods with respect to the total volume of a refrigerator) is improved. Thus, the cost reduction of a refrigerator can be achieved.

As described above, the present invention provides a motor drive device for driving a brushless DC motor including a rotor and a stator having three-phase windings. Furthermore, the present invention includes an inverter for converting DC electric power to AC electric power and supplying the electric power to the brushless DC motor, and a current phase detection unit for detecting a phase of a current flowing through the brushless DC motor. Furthermore, the present invention includes a phase correction unit for outputting a commutation signal for switching a winding to be energized in the brushless DC motor based on a detection result of the current phase detection unit so that a phase of a current flowing in a predetermined winding of the brushless DC motor and a phase of a voltage hold a predetermined relation. Furthermore, the present invention includes a drive unit for outputting a drive signal to the inverter based on the commutation signal output from the phase correction unit, and the drive signal indicates a supplying timing of electric power supplied to the brushless DC motor by the inverter.

Thus, even in drive that does not detect a position of the rotor of the brushless DC motor, the relation between the phase of the current of the motor and the phase of the voltage is stabilized. Therefore, the present invention can extend a drive range of the brushless DC motor.

Furthermore, according to the present invention, the current phase detection unit detects a phase of a current flowing in any one phase of winding among the three-phase windings of the stator of the brushless DC motor. In general, in feedback control for estimating the position of the rotor from a current of the motor, it is necessary to detect at least two phases of currents for separating each current of three phases of currents. The present invention detects only one phase for detecting a reference phase of a specific phase. Thus, a motor drive device can be miniaturized and the cost can be reduced.

Furthermore, according to the present invention, the phase correction unit outputs a commutation signal for switching a winding to be energized in the brushless DC motor based on any timing with reference to the phase of the current in the brushless DC motor. Thus, for example, a zero-crossing point that is detected easily and reliably can be used as a reference. Thus, the present invention can hold the relation between the phase of the current and the phase of the voltage, reliably.

Furthermore, according to the present invention, the phase correction unit corrects an energization time for any one phase of winding of the three-phase windings of the stator of the brushless DC motor, and thereby the phase of the current of the brushless DC motor and the phase of the voltage hold a predetermined relation. Thus, the relation between the phase of the current and the phase of the voltage can be held in an appropriate state corresponding to the load state. Thus, according to the present invention, stabilization of the drive under high-speed and high-load conditions is improved, and a load range in which drive can be carried out can be extended.

Furthermore, according to the present invention, the current phase detection unit detects the phase of the current flowing through the brushless DC motor by detecting a zero-crossing point. Thus, the phase of the current can be detected reliably in a very simple method. Therefore, the present invention can achieve simplification of a motor drive device, cost reduction associated with the simplification, and improvement of reliability.

Furthermore, the present invention further includes a position detection unit for detecting a relative position of the rotor of the brushless DC motor. Furthermore, according to the present invention, the phase correction unit includes a first commutation unit for outputting a first commutation signal for switching a winding to be energized in the brushless DC motor based on a signal of the position detection unit; a second commutation unit for outputting a second commutation signal for switching a winding to be energized in the brushless DC motor based on a phase of a current detected by the current phase detection unit; a load determination unit for determining a load state of the brushless DC motor. Furthermore, the present invention includes a switch unit for switching a commutation signal to be output to the drive unit between the first commutation signal and the second commutation signal based on a determination result of the load determination unit.

Thus, a commutation unit can be switched according to the load state of the brushless DC motor. Therefore, the present invention permits drive with high torque when drive under high-load conditions is required and permits energy-saving drive when drive is carried out under low-load conditions. Furthermore, the present invention decides a phase of a voltage to be applied to the brushless DC motor with reference to the phase of the current flowing in the winding of the stator of the brushless DC motor. Therefore, according to the present invention, the relation between the phase of the current and the phase of the voltage is stabilized in the brushless DC motor, and the stabilization of the drive by the second commutation unit is improved. Thus, a load range and a speed range in which the brushless DC motor can be driven can be largely extended.

Furthermore, according to the present invention, the load determination unit further includes a duty determination unit for determining that a duty of the first commutation signal reaches maximum. Furthermore, according to the present invention, the switch unit switches a signal to be output to the drive unit from the first commutation signal to the second commutation signal when the duty determination unit determines that the duty of the signal reaches maximum.

Thus, when drive is carried out by the first commutation unit under low-load conditions, and when a load is increased as the PWM duty reaches maximum, the drive is switched to drive by the second commutation unit. Therefore, the present invention can extend a load range in which the brushless DC motor can be driven.

Furthermore, according to the present invention, the load determination unit further includes a phase difference determination unit for determining a phase difference between a signal of the position detection unit and the second commutation signal. Furthermore, according to the present invention, the switch unit switches a signal to be output to the drive unit from the second commutation signal to the first commutation signal when the phase difference determination unit determines that the phase difference is smaller than a predetermined value.

Thus, even when drive is carried out by the second commutation unit, when the load is reduced and drive in the first commutation unit becomes possible, the drive is switched to highly efficient drive in the first commutation unit. Thus, the present invention can reduce power consumption.

Furthermore, according to the present invention, the load determination unit further includes a speed regulating unit for reducing a frequency of the second commutation signal when the phase difference determination unit determines that the determined phase difference is larger than a predetermined value. Thus, the present invention can avoid a stop of the out-of-synchronism of the brushless DC motor occurring when the phase of the second commutation unit is deviated from a signal of the position detector.

Furthermore, the present invention further includes a current detection unit for detecting a current flowing through the brushless DC motor, and the current phase detection unit detects a phase of a phase current of the brushless DC motor based on the current detected by the current detection unit. Thus, according to the present invention, a current phase of the brushless DC motor can be obtained easily and reliably, and the motor drive device can be simplified.

Furthermore, the present invention uses a current sensor for the current detection unit. Thus, according to the present invention, circuit loss by the current detector is extremely reduced and a motor drive device with high efficiency can be provided.

Furthermore, according to the present invention, the brushless DC motor includes a rotor made by embedding a permanent magnet in a core, and the rotor has saliency. Thus, in the drive of the brushless DC motor, not only the magnet torque by the permanent magnet but also the reluctance torque by saliency can be efficiently used. Therefore, the present invention can improve low-speed driving efficiency and high-speed driving efficiency.

Furthermore, according to the present invention, the brushless DC motor drives a compressor. Drive control of the compressor does not require highly accurate rotation rate control, acceleration control, and the like, as in an industrial servo motor control and the like. Furthermore, the compressor has a load whose inertia is relatively large, and in particular, in the structure of a recipro type in which reciprocation is carried out, a large-mass metallic crank shaft or a piston is connected to the rotor. Accordingly, it is a load in which the inertia is extremely large and speed change for a short time is extremely small. Therefore, even if detection of a phase of a current is carried out only in one phase, the accuracy of controlling the speed change is not deteriorated. Furthermore, since a drive range of the brushless DC motor is extended, even when a compressor that is the same as in a conventional motor drive device is used, refrigeration capacity can be enhanced. Thus, the present invention can achieve miniaturization and cost reduction of a high-performance refrigeration cycle.

Furthermore, the present invention provides a compressor including a brushless DC motor driven by a motor drive device having the above-mentioned configuration. Thus, a load range and a speed range in which the compressor can be operated are extended. In other words, the present invention provides a compressor that permits operation with high efficiency by driving the brushless DC motor at a low speed when a load is small, and permits operation with high refrigeration capacity by driving the brushless DC motor at a high speed when a load is large.

Furthermore, the present invention provides a refrigerator including the above-mentioned compressor. Thus, a load range and a speed range in which the compressor can be operated are extended. Accordingly, even with, for example, a compressor using a motor designed to have high efficiency and low torque in which the number of windings of the stator is increased, by switching a signal to a second commutation signal output from the second commutation unit, the drive under high-speed and high-load conditions can be carried out. Therefore, the present invention can achieve mutually contrary requirements in, for example, devices such as a refrigerator required to drive at high efficiency in a stable cooling state in most of the day, and to temporarily drive under high-speed and high-load conditions when a door of a refrigerator is opened frequently, for example, in the hours of housework in the morning and the evening, or in the summer season, and in rapid cooling when the temperature of the inside is increased, for example, after a defrosting operation.

INDUSTRIAL APPLICABILITY

A motor drive device of the present invention extends a drive range of a brushless DC motor, and improves a stability of drive under high-speed and high-load conditions. This can extend a load range of the brushless DC motor and can drive a highly efficient motor even under high-speed and high-load conditions, and thus, power consumption of devices can be reduced. Therefore, it can be applied for various applications using a brushless DC motor, for example, air conditioners, washing machines, water heaters, pumps, and the like.

REFERENCE MARKS IN THE DRAWINGS 3 inverter
4 brushless DC motor
4a rotor
4b, 4c, 4d, 4e magnet (permanent magnet)
4f core
5 position detection unit
6 first commutation unit
8 current detection unit
8a AC sensor (current sensor)
9 current phase detection unit
10 second commutation unit
11 load determination unit
12 duty determination unit
13 phase difference determination unit
14 speed regulating unit
15 switch unit
16 drive unit
17 compressor
21 refrigerator
22 motor drive device
25 phase correction unit

The invention claimed is:

1. A motor drive device for driving a brushless DC motor including a rotor and a stator having three-phase windings, the device comprising:
an inverter for converting DC electric power to AC electric power and supplying the electric power to the brushless DC motor;
a current phase detection unit for detecting a phase of a current flowing through the brushless DC motor;
a speed command unit for indicating a command speed of the brushless DC motor;
a position detection unit for detecting a relative position of the rotor of the brushless DC motor;
a phase correction unit for outputting a commutation signal for switching a winding to be energized in the brushless DC motor based on:
a detection result of the current phase detection unit;
the command speed indicated by the speed command unit; and
the relative position detected by the position detection unit,
so that a phase of a current flowing in a predetermined winding of the brushless DC motor and a phase of a voltage hold a predetermined relation; and
a drive unit for outputting a drive signal to the inverter based on the commutation signal output from the phase correction unit,
wherein the drive signal indicates a supplying timing of the electric power supplied to the brushless DC motor by the inverter, and
wherein the phase correction unit outputs the commutation signal so that:
the motor drive device performs a feedback control when the brushless DC motor is under low-load conditions; and
the motor drive device performs a synchronous drive when the brushless DC motor is under high-load conditions, and
wherein the phase correction unit comprises;
a first commutation unit that outputs a first commutation signal for switching a winding to be energized in the brushless DC motor based on a signal of the position detection unit and the command speed; and
a second commutation unit that:
obtains the phase of a current detected by the current phase detection unit, the command speed, and a time from a reference current phase to a commutation;
calculates a finite difference by comparing the time with an average of the time of the past;
calculates a corrected amount of the communication cycle based on the finite difference
decides a corrected commutation cycle of a second commutation signal by adding the corrected amount to the commutation cycle; and
outputs the second commutation signal for switching a winding to be energized in the brushless DC motor.

2. The motor drive device of claim 1,
wherein the current phase detection unit detects a phase of a current flowing in any one phase of winding among the three-phase windings of the stator of the brushless DC motor.

3. The motor drive device of claim 1,
wherein the phase correction unit outputs a commutation signal for switching a winding to be energized in the brushless DC motor based on any timing with reference to the phase of the current in the brushless DC motor.

4. The motor drive device of claim 1,
wherein the phase correction unit corrects an energization time for any one phase of winding of the three-phase windings of the stator of the brushless DC motor, and thereby the phase of the current of the brushless DC motor and the phase of the voltage are held in a predetermined relation.

5. The motor drive device of claim 1,
wherein the current phase detection unit detects the phase of the current flowing through the brushless DC motor by detecting a zero-crossing point.

6. The motor drive device of claim 1,
wherein the phase correction unit further comprises:
a load determination unit that determines a load state of the brushless DC motor; and
a switch unit that:
switches the commutation signal to the first commutation signal to be output to the drive unit between the first commutation signal and the second commutation signal based on a determination result of the load determination unit under the low-load conditions; and
switches the commutation signal to the second commutation signal to be output to the drive unit under the high-load conditions.

7. The motor drive device of claim 6, wherein the load determination unit further comprises a duty determination unit that determines that a duty of the first commutation signal reaches maximum, and the switch unit switches a signal to be output to the drive unit from the first commutation signal to the second commutation signal when the duty determination unit determines that the duty of the signal reaches maximum and judges the brushless DC motor to be under the high-load conditions.

8. The motor drive device of claim 6, wherein the load determination unit further comprise a phase difference determination unit that determines a phase difference between a signal of the position detection unit and the second commutation signal, and the switch unit switches a signal to be output to the drive unit from the second commutation signal to the first commutation signal when the phase difference determination unit determines that the phase difference is smaller than a predetermined value and judges the brushless DC motor to be under the low-load conditions.

9. The motor drive device of claim 8, wherein the load determination unit further comprises a speed regulating unit that reduces a frequency of the second commutation signal when the phase difference determination unit determines that the determined phase difference is larger than a predetermined value.

10. The motor drive device of claim 1, further comprising a current detection unit that detects a current flowing through the brushless DC motor, wherein the current phase detection unit detects a phase of a phase current of the brushless DC motor based on the current detected by the current detection unit.

11. The motor drive device of claim 1, wherein the current detection unit is a current sensor.

12. The motor drive device of claim 1, wherein the brushless DC motor includes a rotor made by embedding a permanent magnet in a core, and the rotor has saliency.

13. The motor drive device of claim 1, wherein the brushless DC motor drives a compressor.

14. A compressor comprising a brushless DC motor driven by a motor drive device of claim 1.

15. A refrigerator comprising a compressor of claim 14.

* * * * *